US010036871B2

(12) United States Patent
Uemura

(10) Patent No.: US 10,036,871 B2
(45) Date of Patent: Jul. 31, 2018

(54) LENS BARREL PROVIDED IN IMAGE PICKUP APPARATUS, AND IMAGE PICKUP APPARATUS

(71) Applicant: CANON KABUSHIKI KAISHA, Tokyo (JP)

(72) Inventor: Kohei Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 15/433,498

(22) Filed: Feb. 15, 2017

(65) Prior Publication Data

US 2017/0242217 A1     Aug. 24, 2017

(30) Foreign Application Priority Data

Feb. 19, 2016 (JP) ................. 2016-029935

(51) Int. Cl.
| | |
|---|---|
| *G02B 7/10* | (2006.01) |
| *G02B 7/02* | (2006.01) |
| *G02B 13/00* | (2006.01) |
| *G02B 15/16* | (2006.01) |
| *H04N 5/225* | (2006.01) |
| *H04N 5/232* | (2006.01) |
| *H04N 5/235* | (2006.01) |
| *H04N 5/378* | (2011.01) |

(52) U.S. Cl.
CPC .............. *G02B 7/10* (2013.01); *G02B 7/023* (2013.01); *G02B 13/009* (2013.01); *G02B 15/16* (2013.01); *H04N 5/2254* (2013.01); *H04N 5/2353* (2013.01); *H04N 5/23293* (2013.01); *H04N 5/23296* (2013.01); *H04N 5/378* (2013.01)

(58) Field of Classification Search
CPC ........ G02B 7/10; G02B 13/009; G02B 15/16; G02B 7/023; H04N 5/23293; H04N 5/378; H04N 5/2254; H04N 5/2353
See application file for complete search history.

(56) References Cited

FOREIGN PATENT DOCUMENTS

JP         2013-156562 A      8/2013

*Primary Examiner* — Jack Dinh
(74) *Attorney, Agent, or Firm* — Cowan, Liebowitz & Latman, P.C.

(57) ABSTRACT

A lens barrel which stably secures strength of a lens barrel without hampering miniaturization thereof. In an inner peripheral portion of a rotary cylinder rotatively driven while being inhibited from moving in a direction of an optical axis on an outer peripheral side of a straight advance cylinder which is movable in the direction of the optical axis while being inhibited from rotating on an outer peripheral side of a cam cylinder and has a through cam groove through which a first projecting portion of the cam cylinder passes, second projecting portions are provided on opposite sides of a straight advance groove of the rotary cylinder, with which the first projecting portion is to be engaged, in a circumferential direction. In an outer peripheral portion of the straight advance cylinder, circumferential grooves with which the second projecting portions are to be engaged are provided in the circumferential direction.

5 Claims, 9 Drawing Sheets

LENS BARREL PROVIDED IN IMAGE PICKUP APPARATUS, AND IMAGE PICKUP APPARATUS

BACKGROUND OF THE INVENTION

Field of the Invention

The present invention relates to a lens barrel provided in an image pickup apparatus such as a film camera or a digital camera, and an image pickup apparatus having the lens barrel.

Description of the Related Art

Some lens barrels provided in a digital camera or the like have a zoom mechanism that moves a plurality of lens holding frames, which respectively holds a plurality of lenses, in a direction of an optical axis through rotation of a cam cylinder while moving the lenses to predetermined positions by restricting rotation of the lens holding frames using a straight advance cylinder.

As the number of lenses has increased due to resent demand for an increase in shooting magnification, a whole length over which a lens barrel is extended tends to increase. It is thus important to secure strength of a lens barrel against external force such as drops. There has conventionally been proposed a technique that secures the strength of a lens barrel by providing a plurality of static pressure projecting portions in an outer peripheral portion of a straight advance cylinder inside the lens barrel (see Japanese Laid-Open Patent Publication (Kokai) No. 2013-156562).

However, according to Japanese Laid-Open Patent Publication (Kokai) No. 2013-156562 mentioned above, a second cam cylinder has a groove portion which is engaged with the static pressure projecting portions provided in the outer peripheral portion of the straight advance cylinder, and the second cam cylinder also has a straight advance groove formed at a deeper level than the groove portion so as to drive a first cam cylinder. Therefore, the second cam cylinder needs to have a thickness for accommodating the groove portion, which is to be engaged with the static pressure projecting portions, and a thickness for accommodating the straight advance groove for driving the first cam cylinder. This could hamper miniaturization of the lens barrel. Moreover, positional relationship between the static pressure projecting portions and the groove portion of the second cam cylinder varies with zoom positions, making it difficult to stably secure the strength of the lens barrel against external force.

SUMMARY OF THE INVENTION

The present invention provides a lens barrel and an image pickup apparatus which stably secure strength of a lens barrel without hampering miniaturization of the lens barrel.

Accordingly, the present invention provides a lens barrel comprising a lens unit configured to be movable in a direction of an optical axis between a collapsed position and a shooting position, a cam cylinder configured to have a first projecting portion in an outer peripheral portion thereof, be provided rotatably in a state of being engaged with the lens unit and movably in the direction of the optical axis, and move the lens unit in the direction of the optical axis by rotating, a straight advance cylinder configured to be provided movably in the direction of the optical axis in a state of being inhibited from rotating on an outer peripheral side of the cam cylinder and have a through cam groove through which the first projecting portion passes, and a rotary cylinder configured be rotatively driven in a state of being inhibited from moving in the direction of the optical axis on an outer peripheral side of the straight advance cylinder and have in the direction of the optical axis a straight advance groove with which the first projecting portion is to be engaged, wherein in an inner peripheral portion of the rotary cylinder, second projecting portions are provided on opposite sides of the straight advance groove in a circumferential direction, and wherein in an outer peripheral portion of the straight advance cylinder, circumferential grooves with which the respective second projecting portions provided on the opposite sides of the straight advance groove in the circumferential direction are to be engaged are provided in the circumferential direction.

According to the present invention, the strength of the lens barrel is stably secured without hampering miniaturization of the lens barrel.

Further features of the present invention will become apparent from the following description of exemplary embodiments (with reference to the attached drawings).

DESCRIPTION OF THE EMBODIMENTS

Hereafter, an embodiment of the present invention will be described with reference to the drawings.

Figure 1A:
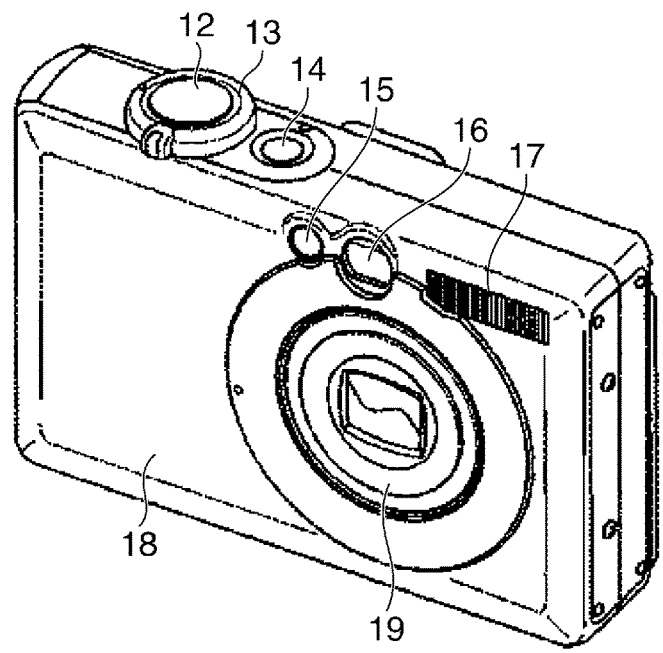
FIG. 1A is a perspective view showing an appearance of a digital camera, which is an example of an image pickup apparatus having a lens barrel according to an embodiment of the present invention, as seen from front.
Figure 1B:
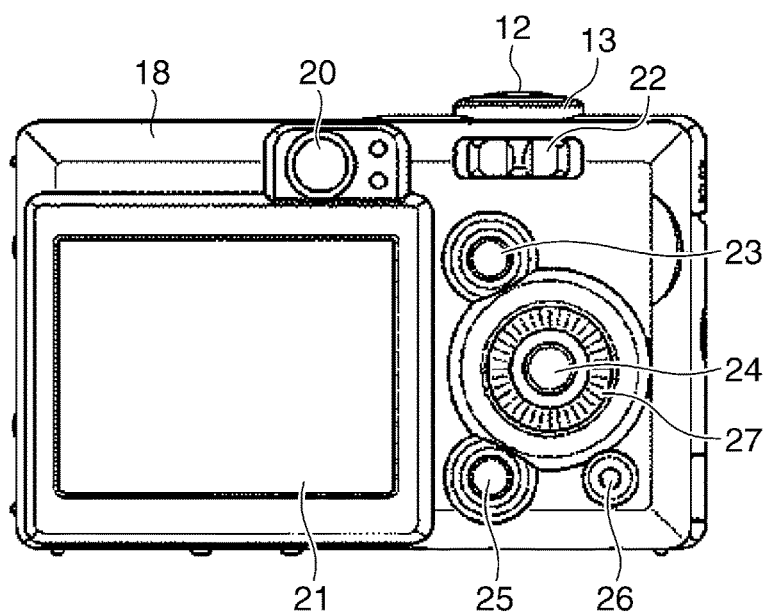
FIG. 1B is a view showing the digital camera in FIG. 1A as seen from behind.

FIG. 1A is a perspective view showing an appearance of a digital camera, which is an example of an image pickup apparatus having a lens barrel according the embodiment of the present invention, as seen from front, and FIG. 1B is a view showing the digital camera in FIG. 1A as seen from behind.

Referring to FIG. 1A, the digital camera 18 according to the present embodiment has, on a front side thereof, a viewfinder 16 for use in determining composition of a subject, an auxiliary light source 15 for use in photometric measurement and distance measurement, a strobe unit 17, and a lens barrel 19. The lens barrel 19 has a zoom mechanism which changes shooting magnifications by moving a plurality of lenses, which constitutes a shooting optical system, in a direction of an optical axis between a retracted position and a shooting position. A release button 12, a power switching button 14, and a zoom switch 13 are provided on an upper side of the digital camera 18.

As shown in FIG. 1B, operation buttons 22 to 27, a display 21 such as an LCD, and a finder eyepiece 20 are provided on a rear side of the digital camera 18. It should be noted that a tripod mounting portion, a memory card drive 42 (see FIG. 2), and a cover for a battery inserting portion are provided on an underside of the digital camera 18 although they are not shown in FIG. 1B.

Figure 2:
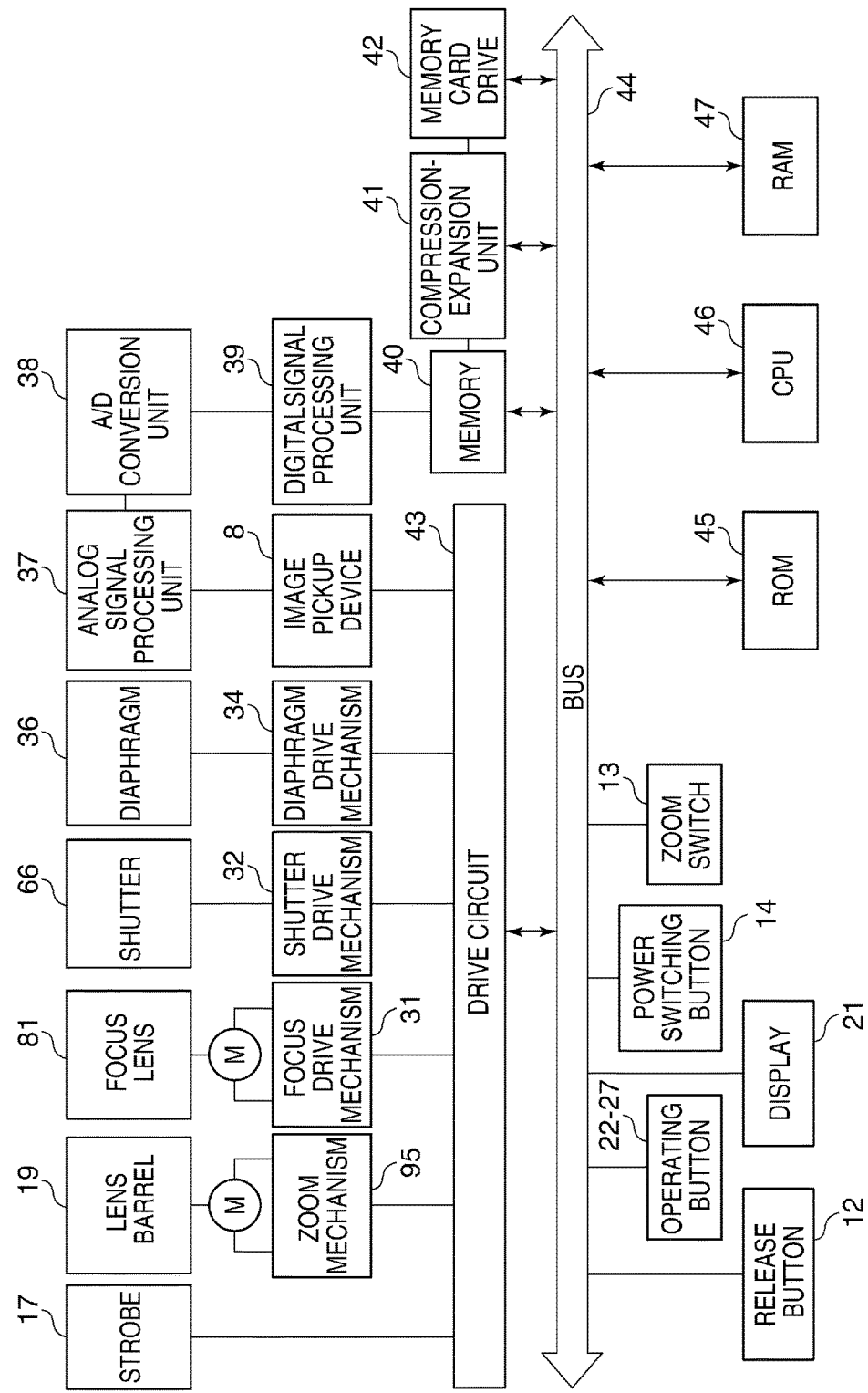
FIG. 2 is a control block diagram of the digital camera in FIGS. 1A and 1B.

FIG. 2 is a control block diagram of the digital camera 18 in FIGS. 1A and 1B. A CPU 46, a ROM 45, a RAM 47, the release button 12, the operating buttons 22 to 27, the display 21, the power switching button 14, the zoom switch 13, a memory 40, a compression-expansion unit 41, the memory card drive 42, and a drive circuit 43 are connected to a bus 44.

A zoom mechanism 95 that zoom-drives the lens barrel 19, a focus drive mechanism 31 that drives a focus lens 81, a shutter drive mechanism 32 that drives a shutter unit 66, and a diaphragm drive mechanism 34 that drives a diaphragm 36 are connected to the drive circuit 43. An image pickup device 8 such as a CCD sensor or CMOS sensor and the strobe unit 17 are also connected to the drive circuit 43. The operation of the units connected to the drive circuit 43 is controlled through the drive circuit 43 based on signals from the CPU 46.

Various control programs and others are stored in the ROM 45, and data required for various control programs is stored in the RAM 47. An analog signal processing unit 37 performs analog processing on image data output from the image pickup device 8 and outputs the image data to an A/D converter 38. The A/D converter 38 converts analog data taken from the image pickup device 8 into digital data and outputs the digital data to a digital signal processing unit 39.

The digital signal processing unit 39 performs predetermined processing on digital data obtained as a result of conversion by the A/D converter 38 and outputs the resulting data as image data to the memory 40. Image data stored in the memory 40 is subjected to, for example, a compression process such as JPEG or TIFF by the compression-expansion unit 41 by operating the operating button 23 and then output to and stored in a memory card inserted in the memory card drive 42.

Also, image data stored in the memory 40 and image data stored in the memory card may be subjected to an expansion process by the compression-expansion unit 41 and then displayed on the display 21 via the bus 44. When a user sees an image displayed on the display 21 and determines that the image is unnecessary, he or she is allowed to delete it by operating the operating button 24.

Figure 3:
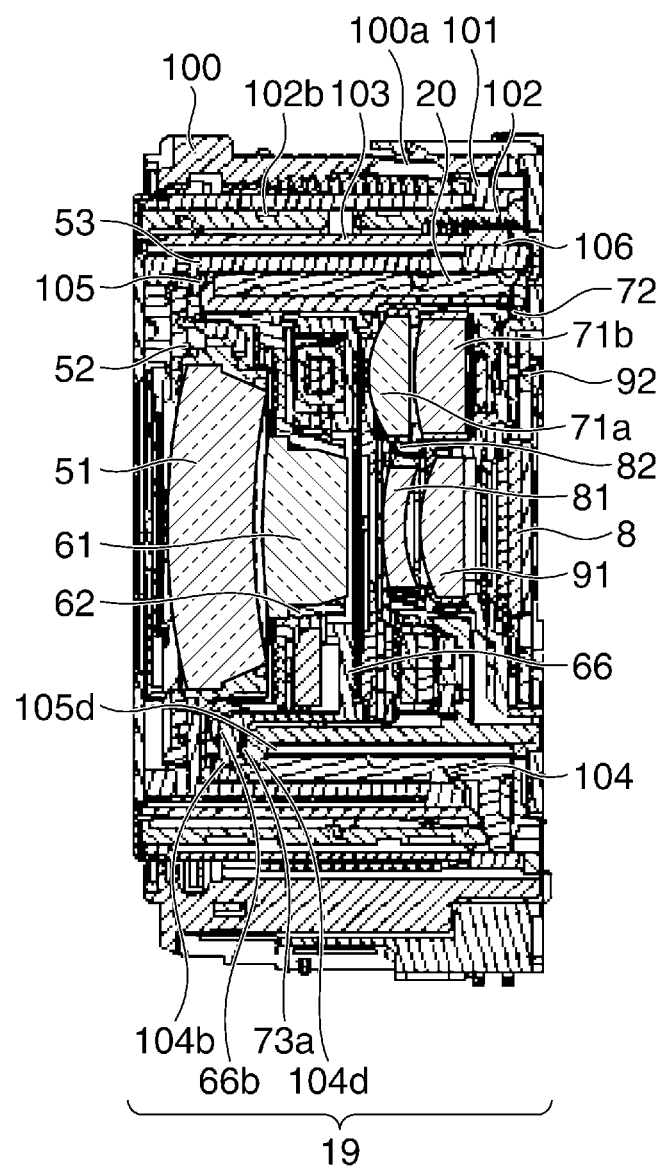
FIG. 3 is a cross-sectional view showing the lens barrel at a retracted position.
Figure 4:
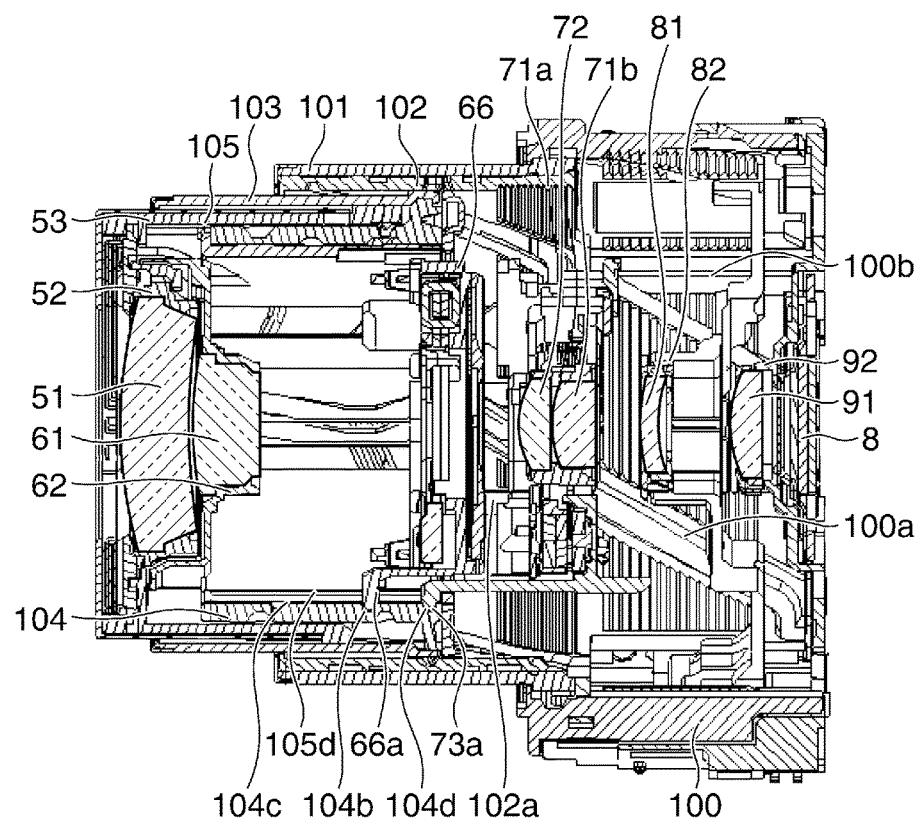
FIG. 4 is a cross-sectional view showing the lens barrel at a shooting position.
Figure 5:
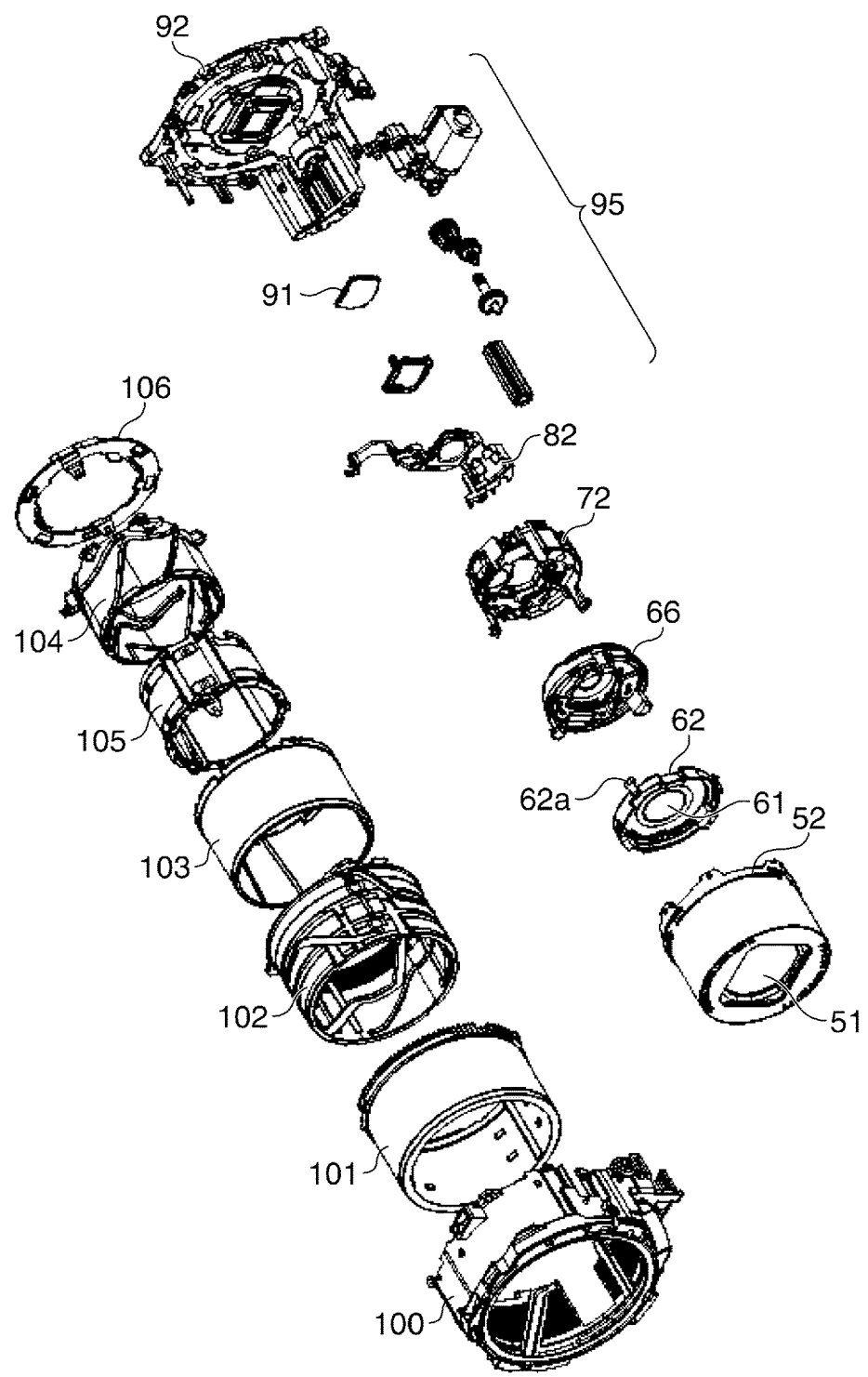
FIG. 5 is an exploded cross-sectional view showing the lens barrel.

Referring next to FIGS. 3 to 9, a description will be given of the lens barrel 19. FIG. 3 is a cross-sectional view showing the lens barrel 19 at the retracted position. FIG. 4 is a cross-sectional view showing the lens barrel 19 at the shooting position. FIG. 5 is an exploded cross-sectional view showing the lens barrel 19.

When the power switching button 14 of the digital camera 18 is turned off, an operation to collapse the lens barrel 19 is performed, causing the lens barrel 19 to move from the shooting position (FIG. 4) to the collapsed position (FIG. 3) in the direction of the optical axis.

As shown in FIGS. 3 to 5, the lens barrel 19 has a group-1 holder 52 holding a group-1 lens 51, a group-1 cylinder 53 holding the group-1 holder 52, and a group-2 holder 62 holding a group-2 lens 61. The lens barrel 19 also has a group-3 holder 72 holding group-3 lenses 71a and 71b, a group-4 holder 82 holding a group-4 lens 81, and a sensor holder 92 holding a group-5 lens 91.

The group-1 lens 51, the group-1 holder 52, and the group-1 cylinder 53 constitute a group-1 lens unit; the group-2 lens 61 and the group-2 holder 62 constitute a group-2 lens unit; the group-3 lenses 71a and 71b, the group-3 holder 72, and a group-3 cylinder 73 constitute a group-3 lens unit. The group-4 lens 81 and the group-4 holder 82 constitute a group-4 lens unit, and the group-5 lens 91 and the sensor holder 92 constitute a group-5 lens unit. The group-1 lens 51, the group-2 lens 61, the group-3 lenses 71a and 71b, the group-4 lens 81, and the group-5 lens 91 constitute a shooting optical system of the lens barrel 19. It should be noted that in the present embodiment, the group-4 lens 81 constitutes a focus lens.

The shutter unit 66 driven by the shutter drive mechanism 32 is placed between the group-2 lens unit and the group-3 lens unit. The shutter unit 66 controls a bundle of rays from a subject, which forms an image on the image pickup device 8, by a pair of shutter blades (not shown) moving within a plane perpendicular to the optical axis and between a position at which they shield an optical path from light and a position at which they are retracted from the optical path.

Figure 6A:
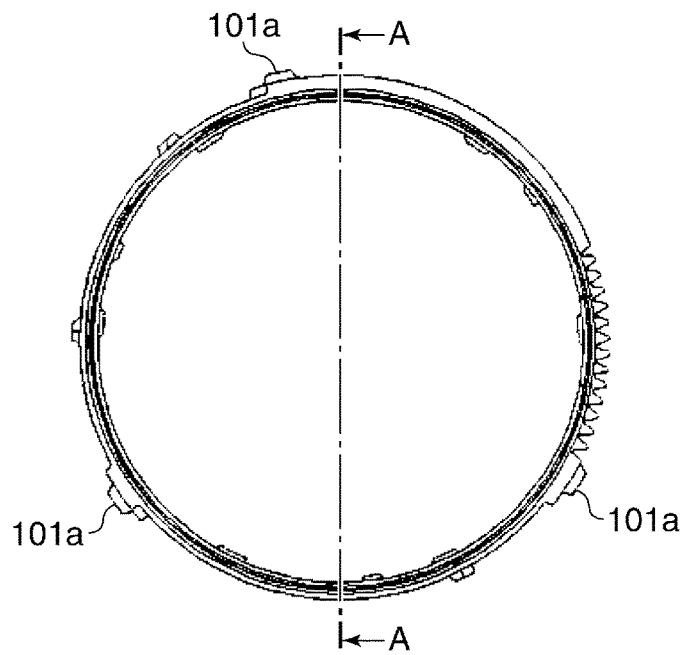
FIG. 6A is a view showing a rotary cylinder as seen from a direction of an optical axis.
Figure 6B:
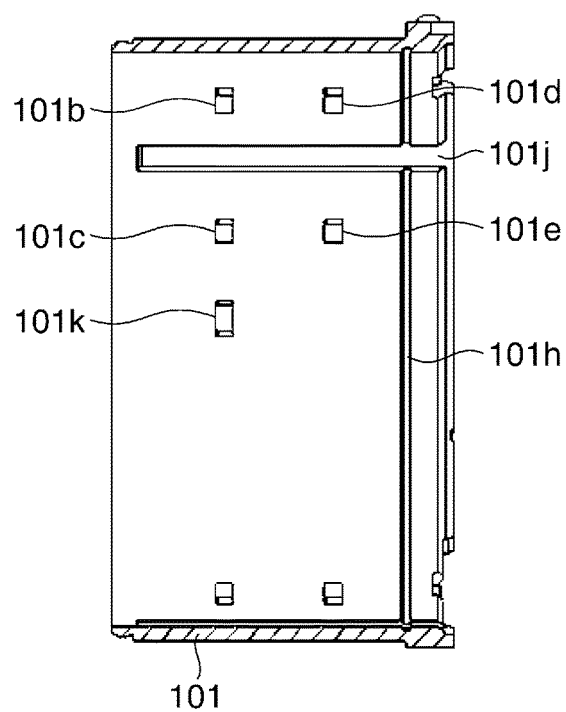
FIG. 6B is a cross-sectional view taken along line A-A in FIG. 6A and showing a state of the lens barrel at the retracted position.
Figure 7A:
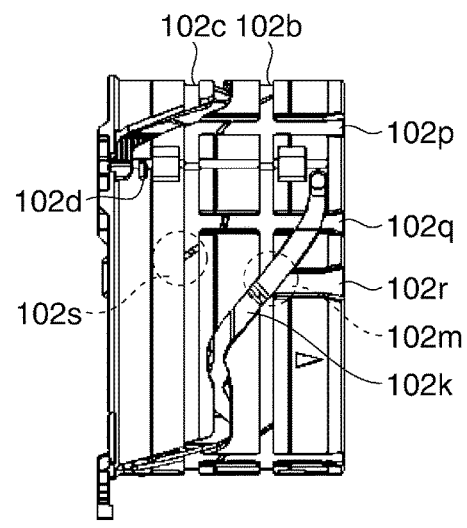
FIG. 7A is a side view showing an outer straight advance cylinder.
Figure 7B:
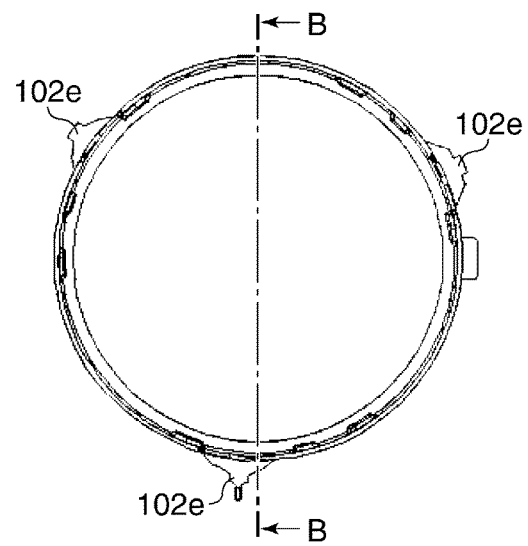
FIG. 7B is a view showing the outer straight advance cylinder as viewed from the direction of the optical axis.
Figure 7C:
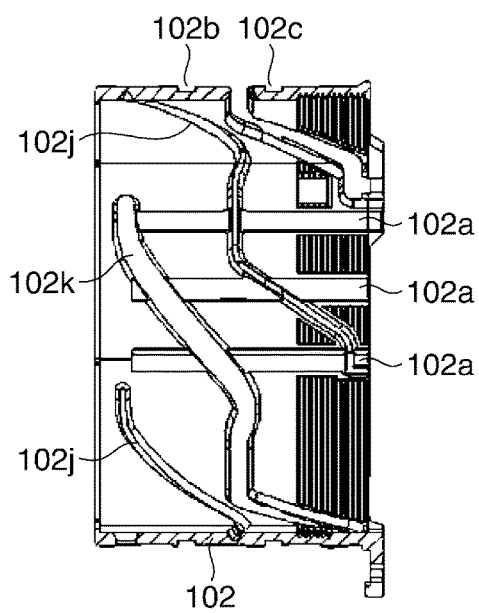
FIG. 7C is a cross-sectional view taken along line B-B in FIG. 7B.

The sensor holder 92 supports the focus drive mechanism 31 (see FIG. 2) and the zoom mechanism 95. A focusing operation is performed by the focus drive mechanism 31 moving the group-4 holder 82, which holds the group-4 lens 81, forward and backward in the direction of the optical axis, and a zooming operation is performed by the zoom mechanism 95 moving the group-1 unit through the group-3 unit forward and backward in the direction of the optical axis Referring next to FIGS. 3 to 7C, a description will be given of the zoom mechanism 95. FIG. 6A is a view showing a rotary cylinder 101 as seen from the direction of the optical axis, and FIG. 6B is a cross-sectional view taken along line A-A in FIG. 6A. FIG. 7A is a side view showing an outer straight advance cylinder 102, FIG. 7B is a view showing the outer straight advance cylinder 102 as seen from the direction of the optical axis, and FIG. 7C is a cross-sectional view taken along line B-B in FIG. 7B.

As shown in FIGS. 3 to 5, a fixed cylinder 100 is provided on an outermost peripheral side of the lens barrel 19, the rotary cylinder 101 rotatively driven by the zoom mechanism 95 is provided on an inner peripheral side of the fixed cylinder 100, and the outer straight advance cylinder 102 is provided on an inner peripheral side of the rotary cylinder 101. An inner cam cover 103 is provided on an inner peripheral side of the outer straight advance cylinder 102, an inner cam cylinder 104 is provided on an inner peripheral side of the inner cam cover 103, and a straight advance cylinder 105 is held on an inner peripheral side of the inner cam cylinder 104 such that the straight advance cylinder 105 is rotatable relatively to the inner cam cylinder 104.

In an inner peripheral portion of the fixed cylinder 100, three cam grooves 100a and three straight advance key grooves 100b are formed at substantially regular intervals in a circumferential direction.

In an outer peripheral portion of the rotary cylinder 101, three followers 101a which are to be engaged with the cam grooves 100a of the fixed cylinder 100 are formed at substantially regular intervals in a circumferential direction as shown in FIG. 6A. The rotary cylinder 101 is rotatively driven by the zoom mechanism 95 to move in the direction of the optical axis along lifts of the cam grooves 100a while rotating with respect to the fixed cylinder 100.

In an inner peripheral portion of the rotary cylinder 101, static pressure projecting portions 101b, 101c, 101d, 101e, and 101k are formed at three locations at substantially regular intervals in a circumferential direction as shown in FIG. 6B. In the inner peripheral portion of the rotary cylinder 101, a bayonet groove 101h as well is formed in the circumferential direction. The static pressure projecting portions 101b, 101c, 101d, 101e, and 101k correspond to exemplary second projecting portions of the present invention.

In an outer peripheral portion of the outer straight advance cylinder 102, circumferential grooves 102b and 102c, straight advance keys 102e, a through cam groove 102k, and bayonet claws 102d are formed as shown in FIG. 7A. In an inner peripheral portion of the outer straight advance cylinder 102, cam grooves 102j and straight advance key grooves 102a are formed as shown in FIG. 7C.

The circumferential grooves 102b and 102c are engaged with the static pressure projecting portions 101b, 101c, 101d, 101e, and 101k of the rotary cylinder 101, the straight advance keys 102e are engaged with the straight advance key grooves 100b of the fixed cylinder 100, and the through cam groove 102k has the same lift as that of the cam grooves 102j. The bayonet claws 102d are formed at three locations at substantially regular intervals in a circumferential direction and engaged with the bayonet groove 101h of the rotary cylinder 101. The outer straight advance cylinder 102 linearly moves in the direction of the optical axis along the straight advance key grooves 100b of the fixed cylinder 100 as the rotary cylinder 101 rotates.

In an inner peripheral portion of the inner cam cylinder 104, a group-2 cam groove (not shown), a shutter cam groove 104b, and a group-3 cam groove 104d are formed at three locations at substantially regular intervals in a circumferential direction. In an outer peripheral portion of the inner cam cylinder 104, six group-1 cam grooves 104c are formed at substantially regular intervals in the circumferential direction. Also, in the outer peripheral portion of the inner cam cylinder 104, a follower 104f and a drive key 104h (see FIGS. 8A and 8B) are formed at three locations at substantially regular intervals in the circumferential direction. The followers 104f of the inner cam cylinder 104 are engaged with the cam grooves 102j of the outer straight advance cylinder 102.

Three engaging claws (not shown), which are to be engaged with engaging portions (not shown) of the inner cam cylinder 104, and three rotation stoppers (not shown) which are to be engaged with the drive keys 104h of the inner cam cylinder 104 are formed in the inner cam cover 103. The drive keys 104h of the inner cam cylinder 104, each of which has a predetermined clearance from the through cam groove 102k, penetrate the outer straight advance cylinder 102 and are engaged with three key grooves 101j provided in the inner peripheral portion of the rotary cylinder 101. The drive keys 104h correspond to exemplary first projecting portions of the present invention, and the key grooves 101j correspond to exemplary straight advance grooves of the present invention.

With the above arrangement, the inner cam cylinder 104 rotates about the optical axis in the same phase as that of the rotary cylinder 101, and as the inner cam cylinder 104 rotates, the inner cam cover 103 moves in the direction of the optical axis along the lifts of the cam grooves 102j while rotating integrally with the inner cam cylinder 104.

A straight advance plate 106 is integrally mounted on the straight advance cylinder 105. Straight advance keys (not shown), which are to be engaged with the straight advance key grooves 102a provided in the inner peripheral portion of the outer straight advance cylinder 102, are formed in the straight advance plate 106. A group-1 guide key 105b, a group-2 guide groove (not shown), and a group-3 guide groove 105d as well are formed in the straight advance cylinder 105. The straight advance cylinder 105 is held in a state of being inhibited from being rotated with respect to the inner cam cylinder 104 and moves integrally with the inner cam cylinder 104 in the direction of the optical axis.

Group-1 followers (not shown) provided in an inner peripheral portion of the group-1 cylinder 53 are engaged with the six group-1 cam grooves 104c provided in the outer peripheral portion of the inner cam cylinder 104. As a result, the group-1 cylinder 53 is guided by the group-1 guide key 105b of the straight advance cylinder 105 to move integrally with the group-1 holder 52 in the direction of the optical axis.

Three group-2 followers 62a (see FIG. 5) provided in an outer peripheral portion of the group-2 holder 62 are engaged with respective three group-2 cam grooves (not shown) provided in the inner peripheral portion of the inner cam cylinder 104. The group-2 holder 62 is guided by the group-2 guide groove (not shown) of the straight advance cylinder 105 so that it can be supported movably in the direction of the optical axis.

Three shutter followers 66a provided in an outer peripheral portion of the shutter unit 66 are engaged with the respective three shutter cam grooves 104b provided in the inner peripheral portion of the inner cam cylinder 104. The shutter unit 66 is guided by the group-3 guide groove 105b of the straight advance cylinder 105 so that it can be supported movably in the direction of the optical axis.

Three group-3 followers 73a provided in an outer peripheral portion of the group-3 cylinder 73 are engaged with the respective three group-3 cam grooves 104d provided in the inner peripheral portion of the inner cam cylinder 104. The group-3 lens unit is guided by the group-3 guide groove 105d of the straight advance cylinder 105 so that it can be supported movably in the direction of the optical axis.

Figure 8A:
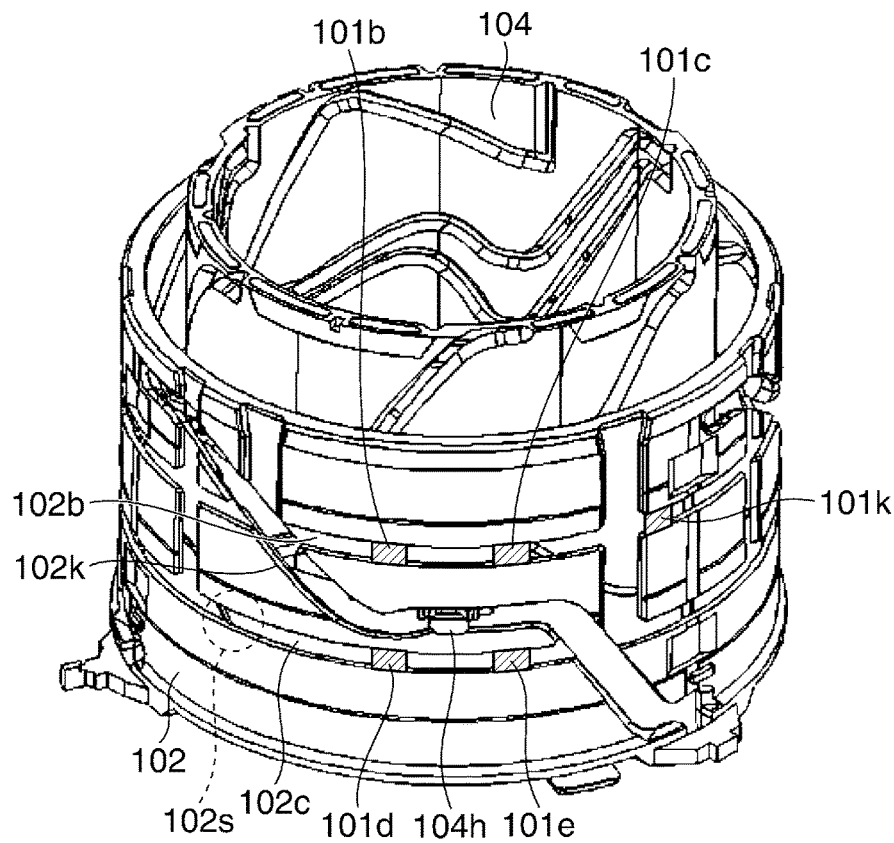
FIG. 8A is a perspective view useful in explaining a relationship among the rotary cylinder, the outer straight advance cylinder, and an inner cam cylinder.
Figure 8B:
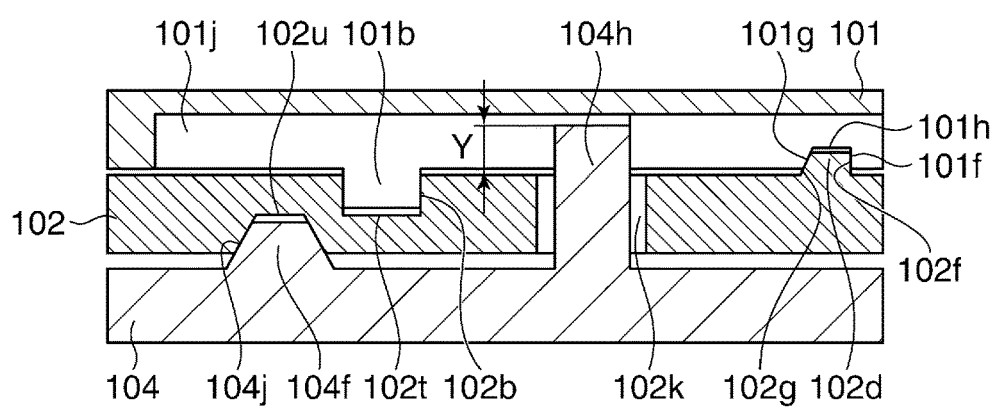
FIG. 8B is a cross-sectional view showing essential parts useful in explaining the relationship among the rotary cylinder, the outer straight advance cylinder, and the inner cam cylinder.

Referring next to FIGS. 8A and 8B, a description will be given of a relationship among the rotary cylinder 101, the outer straight advance cylinder 102, and the inner cam cylinder 104. FIG. 8A is a perspective view useful in explaining the relationship among the rotary cylinder 101, the outer straight advance cylinder 102, and the inner cam cylinder 104, and FIG. 8B is a cross-sectional showing essential parts useful in explaining the relationship among the rotary cylinder 101, the outer straight advance cylinder 102, and the inner cam cylinder 104.

As shown in FIGS. 8A and 8B, positions of the rotary cylinder 101 and the outer straight advance cylinder 102 in the direction of the optical axis are restricted through engagement of the bayonet groove 101h and the bayonet claws 102d. Surfaces of the bayonet claws 102d on their front side are flank surfaces 102g tilted with respect to a plane perpendicular to the optical axis. Likewise, a surface of the bayonet groove 101h on its front side is a flank surface 101g tilted correspondingly to the flank surface 102g.

Surfaces of the bayonet claws 102d on their rear side are position restricting surfaces 102f perpendicular to the optical axis. Likewise, a surface of the bayonet groove 101h on its rear side is a position restricting surface 101f perpendicular to the optical axis. The flank surfaces 102g and the position restricting surfaces 102f of the bayonet claws 102d abut against the flank surface 101g and the position restricting surface 101f of the bayonet groove 101h to restrict positions in the direction of the optical axis and the direction perpendicular to the optical axis. Since the position restricting surfaces 101f and 102f are perpendicular to the optical axis, the outer straight advance cylinder 102 resists falling off the rotary cylinder 101 when external force is applied to it from front.

Further, the static pressure projecting portions 101b, 101c, and 101k and the static pressure projecting portions 101d and 101e of the rotary cylinder 101 are engaged with the circumferential groove 102b and the circumferential groove 102c, respectively, of the outer straight advance cylinder 102 so as to secure strength against external force. As shown in FIG. 6B, the static pressure projecting portions 101b and 101d are placed side by side in the direction of the optical axis, and the static pressure projecting portions 101c and 101e are placed side by side in the direction of the optical axis and at locations away from the static pressure projecting portions 101b and 101d in the circumferential direction. The static pressure projecting portion 101b and the static pressure projecting portion 101c are placed on opposite sides of the key groove 101j in the circumferential direction, and likewise, the static pressure projecting portion 101d and the static pressure projecting portion 101e as well are placed on opposite sides of the key groove 101j in the circumferential direction.

Since the inner cam cylinder 104 and the rotary cylinder 101 rotate about the optical axis in the same phase, as shown in FIG. 8A, the drive key 104h which is to be engaged with the key groove 101j moves while changing its positional relationship with the static pressure projecting portions 101b, 101c, 101d, and 101e only in the direction of the optical axis. Thus, when external force is applied to the inner cam cylinder 104 at any position thereof while it is rotating, both sides of the drive key 104h in the circumferential direction are held by engagement of the static pressure projecting portions 101b, 101c, 101d, and 101e and the circumferential grooves 102b and 102c of the outer straight advance cylinder 102. This stably secures the strength of the lens barrel 19 against external force.

As shown in FIG. 7A, introducing grooves 102p, 102q, and 102r for introducing the static pressure projecting portions 101b, 101c, 101d, 101e, and 101k of the rotary cylinder 101 into the circumferential grooves 102b and 102c are formed in the outer peripheral portion of the outer straight advance cylinder 102. The static pressure projecting portions 101b and 101b are introduced from the introducing groove 102p, the static pressure projecting portions 101c and 101e are introduced from the introducing groove 102q, and the static pressure projecting portion 101k is introduced from the introducing groove 102r.

The circumferential grooves 102b and 102c are opened in their front side (the right-hand side as viewed in FIG. 7A) by the introducing grooves 102p, 102q, and 102r, and hence if the static pressure projecting portions 101b, 101c, 101d, 101e, and 101k overlap the opened areas at the same time, the strength against external force cannot be secured. For this reason, the static pressure projecting portions 101b, 101c, 101d, 101e, 101k are configured to overlap those areas at the same time only when the rotary cylinder 101 is introduced into the outer straight advance cylinder 102.

Furthermore, the introducing groove 102r is in communication with an intersecting area 102m where the through cam groove 102k and the circumferential groove 102k intersect each other. Since the front side of the circumferential groove 102b is opened because the through cam groove 102k and the circumferential groove 102b intersect each other in the intersecting area 102m, there are no additional areas newly opened by the intersecting area 102m. As a result, the static pressure projecting portion 101k is disposed without lowering the strength against external force.

Figure 9:
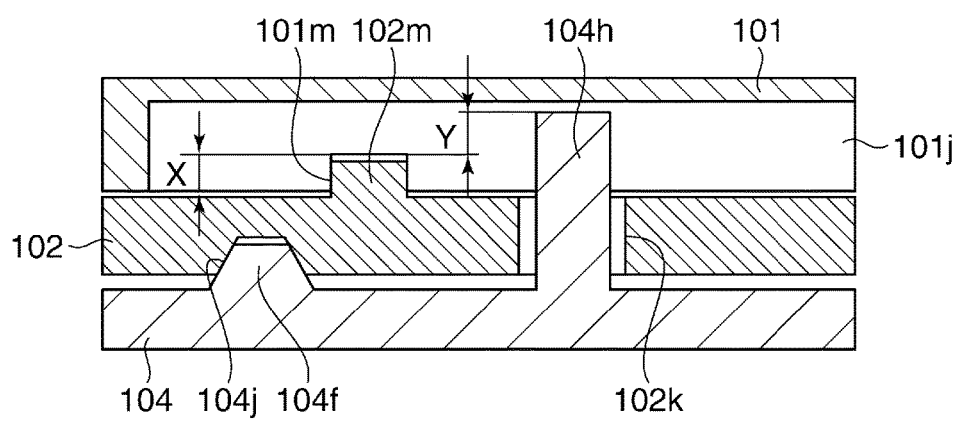
FIG. 9 is a cross-sectional view showing essential parts useful in explaining a prior art compared to the present invention in FIG. 8B.

FIG. 9 is a cross-sectional view showing essential parts useful in explaining a prior art compared to the present invention in FIG. 8B. It should be noted that for the convenience of explanation, parts corresponding to those of the present invention in FIG. 8B are designated by the same reference symbols.

According to the prior art in FIG. 9, a circumferential groove 101m is provided in the inner peripheral portion of the rotary cylinder 101, and a static pressure projecting portion 102m is provided in the outer peripheral portion of the outer straight advance cylinder 102. A key groove 101j as well is provided in the inner peripheral portion of the rotary cylinder 101, and hence a depth X of the circumferential groove 101m and an amount Y by which the key groove 101j and the drive key 104h are hooked on each other are needed.

On the other hand, according to the present invention in FIG. 8B, since the circumferential grooves 102b and 102c are provided in the outer peripheral portion of the outer straight advance cylinder 102, the depth X of the circumferential groove 101m is not needed, making miniaturization possible. Moreover, the distances from groove bottom surfaces 102t of the circumferential grooves 102b and 102c to the optical axis and the distance from groove bottom surfaces 102u of the cam grooves 102j to the optical axis are set to be substantially equal, and this makes the outer diameter of the outer straight advance cylinder 102 small. It should be noted that bottom hole 102s shown in FIGS. 7A and 8A are formed by the groove bottom surfaces 102t and the groove bottom surfaces 102u intersecting each other, but they never affect the operation of the rotary cylinder 101 and the outer straight advance cylinder 102 because the distances from the groove bottom surfaces 102t and the groove bottom surfaces 102u to the optical axis are substantially equal.

As described above, the strength of the lens barrel 19 against external force is stably secured without hampering miniaturization of the lens barrel 19.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-029935, filed Feb. 19, 2016 which is hereby incorporated by reference herein in its entirety.

What is claimed is:

1. A lens barrel comprising:
a lens unit configured to be movable in a direction of an optical axis between a collapsed position and a shooting position;
a cam cylinder configured to have a first projecting portion in an outer peripheral portion thereof, be provided rotatably in a state of being engaged with said lens unit and movably in the direction of the optical axis, and move said lens unit in the direction of the optical axis by rotating;
a straight advance cylinder configured to be provided movably in the direction of the optical axis in a state of being inhibited from rotating on an outer peripheral side of said cam cylinder and have a through cam groove through which said first projecting portion passes; and
a rotary cylinder configured be rotatively driven in a state of being inhibited from moving in the direction of the optical axis on an outer peripheral side of said straight advance cylinder and have in the direction of the optical axis a straight advance groove with which the first projecting portion is to be engaged,
wherein in an inner peripheral portion of said rotary cylinder, second projecting portions are provided on opposite sides of said straight advance groove in a circumferential direction, and
wherein in an outer peripheral portion of said straight advance cylinder, circumferential grooves with which the respective second projecting portions provided on the opposite sides of said straight advance groove in the circumferential direction are to be engaged are provided in the circumferential direction.

2. The lens barrel according to claim 1, wherein in an outer peripheral portion of said straight advance cylinder, introducing grooves for introducing the second projecting portions into the circumferential grooves are provided in the direction of the optical axis.

3. The lens barrel according to claim 2, wherein at least one of areas where the circumferential groove and the through cam groove intersect each other is in communication with the introducing groove.

4. The lens barrel according to claim 1, wherein a follower that is to be engaged with a cam groove provided in an inner peripheral portion of said straight advance cylinder is provided in an outer peripheral portion of said cam cylinder, and
a distance from groove bottom surfaces of the circumferential grooves to the optical axis and a distance from a groove bottom surface of the cam groove to the optical axis are set to be substantially equal.

5. An image pickup apparatus having a lens barrel, wherein the lens barrel comprises:
a lens unit that is movable in a direction of an optical axis between a collapsed position and a shooting position;
a cam cylinder that has a first projecting portion in an outer peripheral portion thereof, is provided rotatably in a state of being engaged with the lens unit and movably in the direction of the optical axis, and moves the lens unit in the direction of the optical axis by rotating;
a straight advance cylinder that is provided movably in the direction of the optical axis in a state of being inhibited from rotating on an outer peripheral side of the cam cylinder and has a through cam groove through which the first projecting portion passes; and
a rotary cylinder that is rotatively driven in a state of being inhibited from moving in the direction of the optical axis on an outer peripheral side of the straight advance cylinder and has in the direction of the optical axis a straight advance groove with which the first projecting portion is to be engaged,
wherein in an inner peripheral portion of the rotary cylinder, second projecting portions are provided on opposite sides of the straight advance groove in a circumferential direction, and
wherein in an outer peripheral portion of the straight advance cylinder, circumferential grooves with which the respective second projecting portions provided on the opposite sides of the straight advance groove in the circumferential direction are to be engaged are provided in the circumferential direction.

* * * * *